(12) United States Patent
Salmon, III et al.

(10) Patent No.: US 7,510,209 B2
(45) Date of Patent: Mar. 31, 2009

(54) AIRBAG MODULE WITH INTEGRAL LOCKING MECHANISM AND METHOD OF MAKING

(75) Inventors: John D. Salmon, III, Dayton, OH (US); Michael Noland, Dayton, OH (US); Dale E. Collins, Brookville, OH (US); Charles D. Griever, Jr., Springfield, OH (US); Barry C. Worrell, Centerville, OH (US); Richard S. Plummer, Huber Heights, OH (US)

(73) Assignee: Delphi Technologies, Inc., Troy, MI (US)

(*) Notice: Subject to any disclaimer, the term of this patent is extended or adjusted under 35 U.S.C. 154(b) by 399 days.

(21) Appl. No.: 11/184,059

(22) Filed: Jul. 18, 2005

(65) Prior Publication Data

US 2006/0055154 A1 Mar. 16, 2006

Related U.S. Application Data

(60) Provisional application No. 60/608,595, filed on Sep. 10, 2004.

(51) Int. Cl.
*B60R 21/16* (2006.01)
*B60R 21/203* (2006.01)
(52) U.S. Cl. .............. 280/728.2; 280/731; 280/732
(58) Field of Classification Search ........... 280/728.2, 280/731
See application file for complete search history.

(56) References Cited

U.S. PATENT DOCUMENTS

| | | | | | |
|---|---|---|---|---|---|
| 5,683,099 | A | * | 11/1997 | Ido et al. ............ | 280/728.2 |
| 5,855,392 | A | * | 1/1999 | Simpson et al. ...... | 280/731 |
| 6,092,832 | A | * | 7/2000 | Worrell et al. ....... | 280/728.2 |
| 6,149,186 | A | * | 11/2000 | Manfrin .............. | 280/728.2 |
| 6,196,573 | B1 | * | 3/2001 | Worrell et al. ....... | 280/728.2 |
| 2001/0054810 | A1 | * | 12/2001 | Sakane et al. ........ | 280/728.2 |

* cited by examiner

*Primary Examiner*—Christopher P Ellis
*Assistant Examiner*—Jacob Meyer
(74) *Attorney, Agent, or Firm*—Douglas D. Feket

(57) ABSTRACT

A method and apparatus for mounting an airbag module to a vehicle, the apparatus comprising a backing plate for mounting the airbag module to the vehicle, the backing plate comprising: a plurality of elongated mounting members each being drawn from the material of the backing plate wherein the plurality of elongated mounting members are integrally formed with the backing plate and each of the plurality of elongated mounting members has a portion comprising a periphery formed from the material of the backing plate and an opening extending into the elongated mounting member, the opening defining the periphery of the plurality of elongated mounting members. The method comprising: stamping a blank material to form a periphery and a central opening of the backing plate, wherein a mounting surface is located between the central opening and the periphery; and deep drawing at least one mounting member from the mounting surface, wherein the at least one mounting member provides a securement feature for the backing plate.

13 Claims, 17 Drawing Sheets

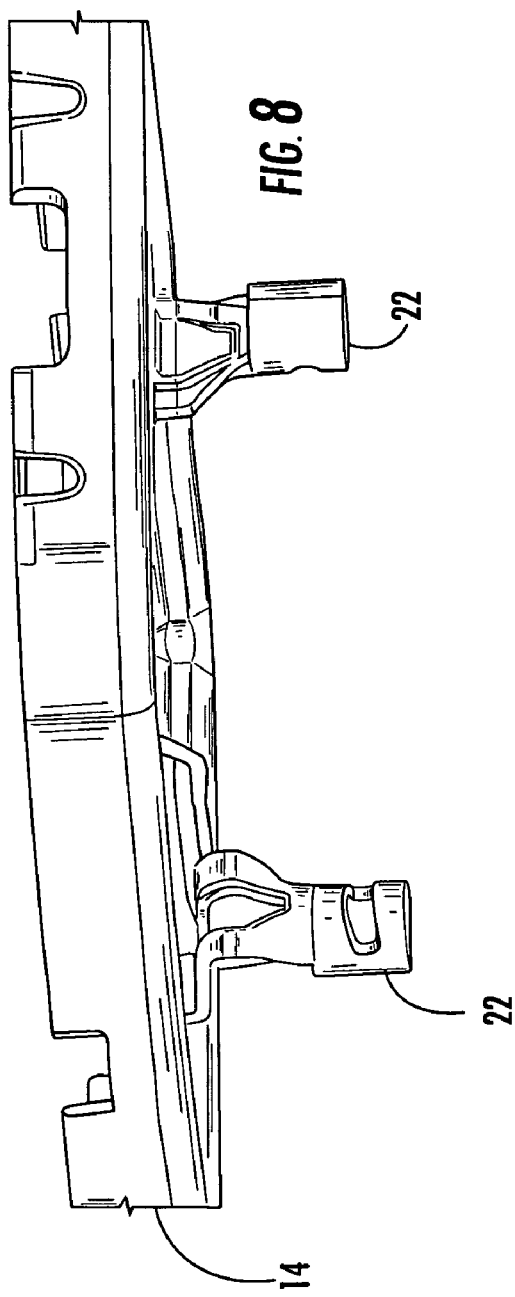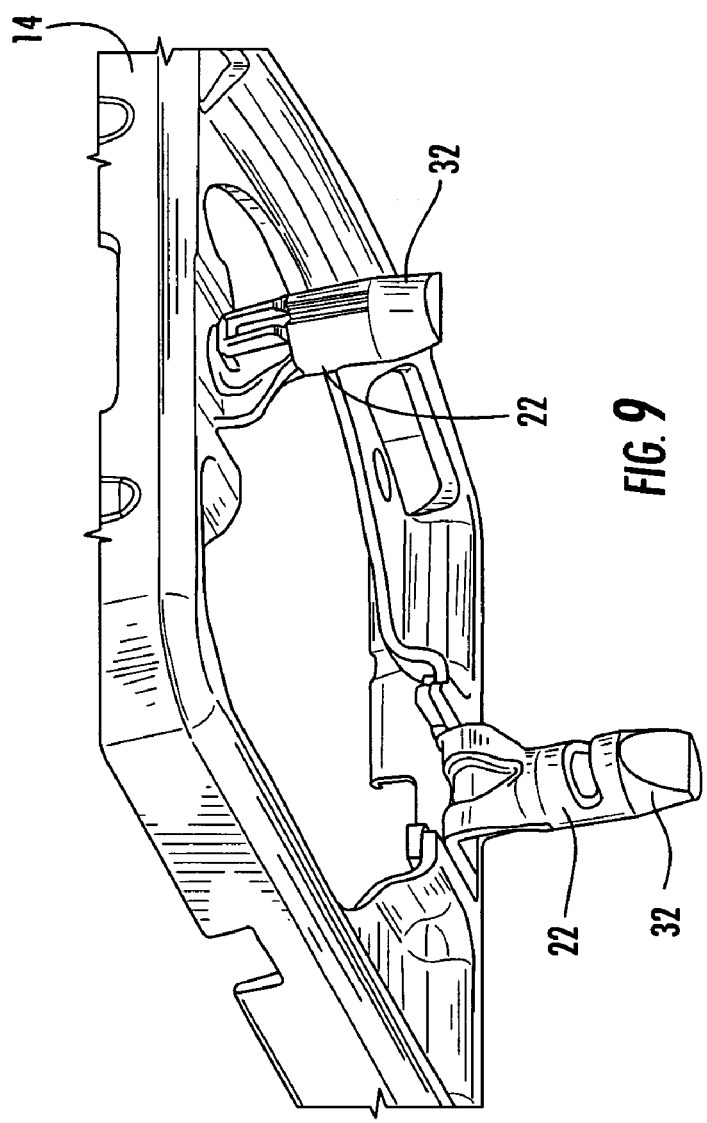

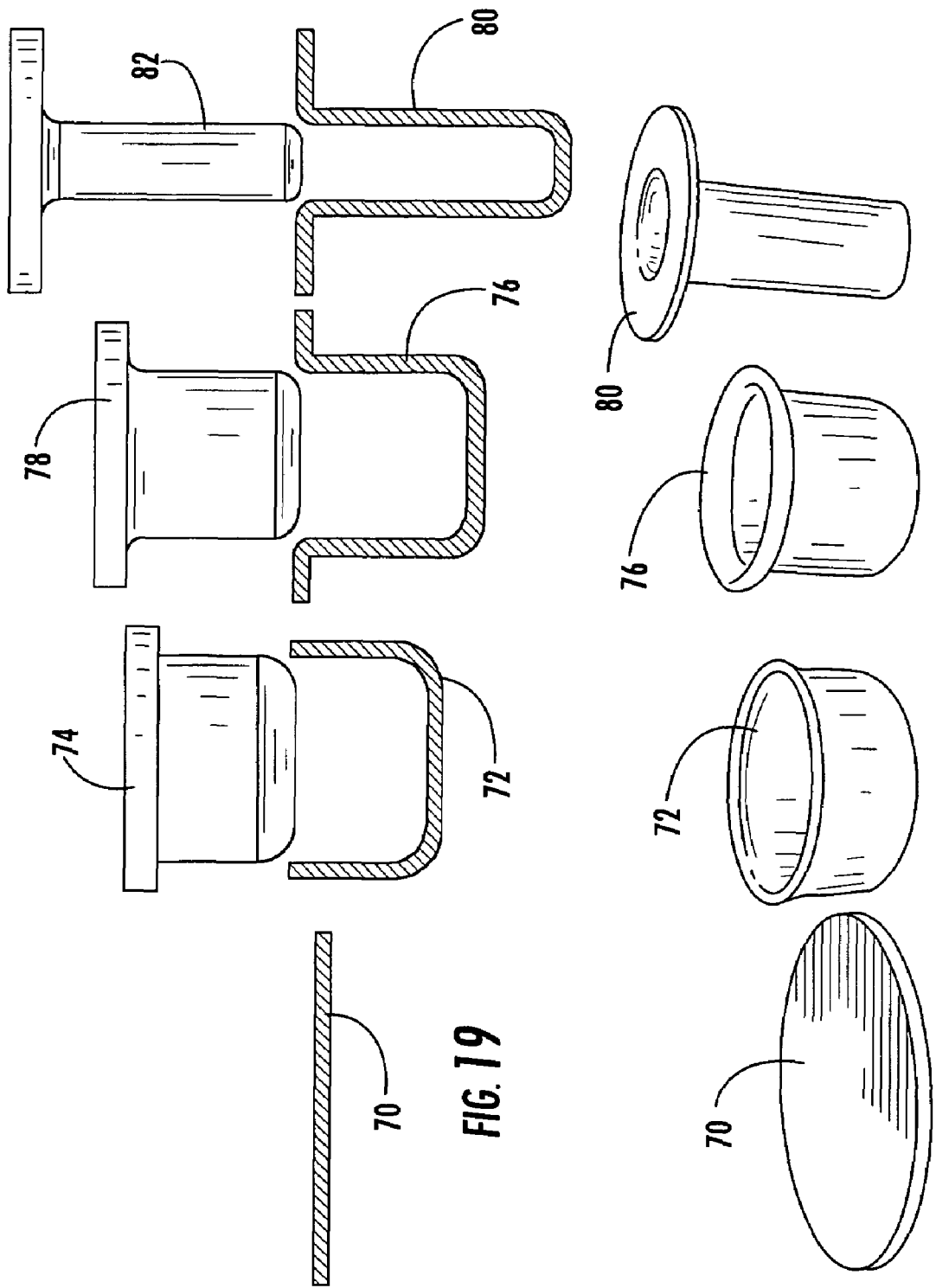

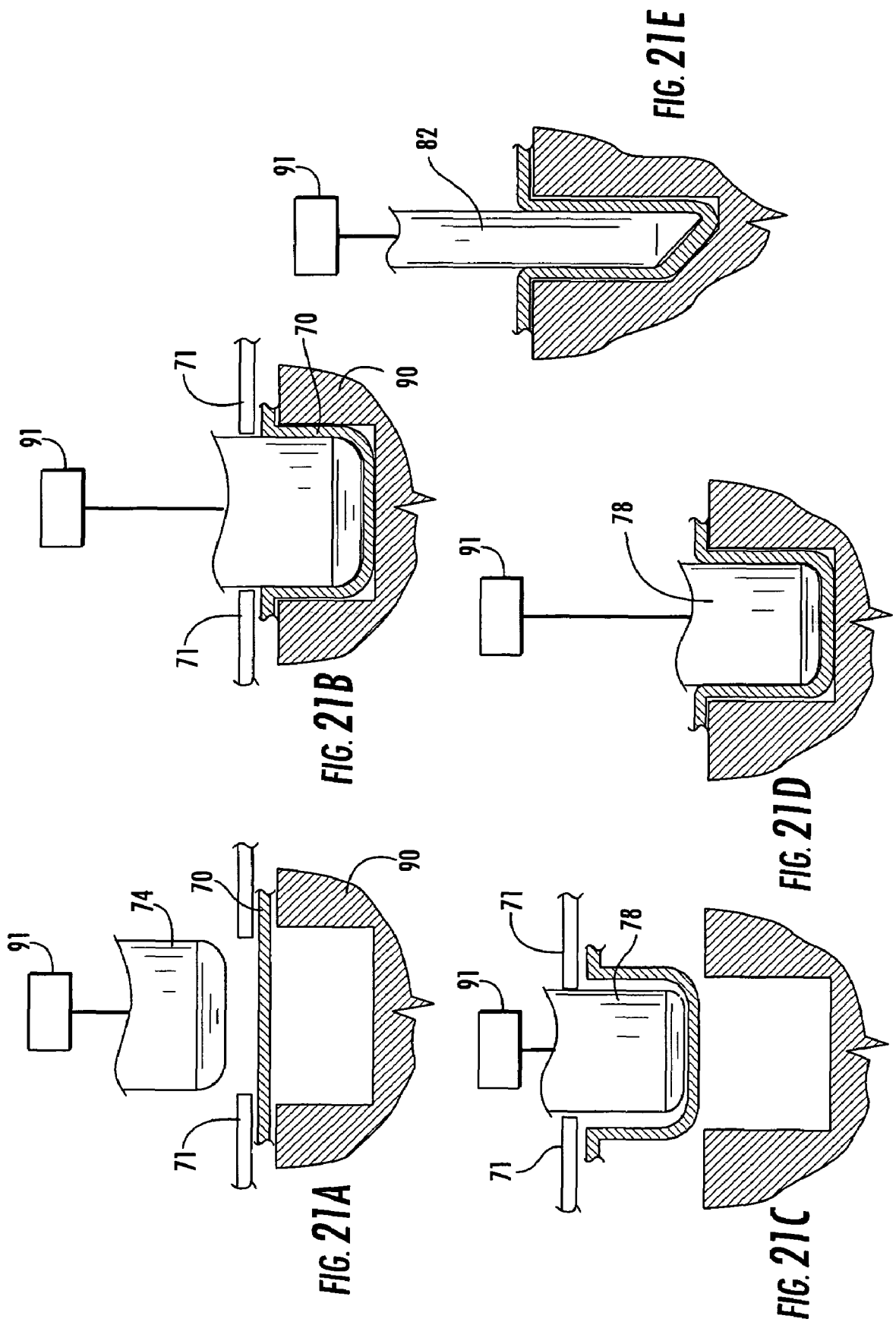

AIRBAG MODULE WITH INTEGRAL LOCKING MECHANISM AND METHOD OF MAKING

CROSS REFERENCE TO RELATED APPLICATIONS

This application claims the benefit of provisional patent application Ser. No. 60/608,595, filed Sep. 10, 2004, the contents of which are incorporated herein by reference thereto.

TECHNICAL FIELD

The present disclosure relates to airbag modules and more particularly the present disclosure relates to an apparatus and method for providing a locking mechanism for securing an airbag module to a vehicle component.

BACKGROUND

This application is also related to U.S. Pat. Nos. 5,380,037; 6,196,573; and 6,237,944, the contents of which are also incorporated herein by reference thereto.

Vehicles are supplied with driver side airbag modules; generally the driver side airbag module is located in the center of the steering wheel. This is also the same location where a horn-activating switch has traditionally been mounted. In addition, other inflatable cushions or airbag modules have been installed in vehicles.

Various mounting mechanisms have been used for securing airbag modules to support structures in a vehicle. Non-limiting examples of such support structures include steering wheels and vehicle instrument panels. In one known mounting mechanism, mounting bolts are passed through openings in the vehicle support structures wherein a threaded portion of the mounting bolts engages a complimentary nut or threaded portion of the airbag module.

Another mechanism for use with a driver side airbag module includes a means for providing a horn activation circuit wherein horn contact members are forced into contact in order to complete a horn activation circuit.

However, current attachment mechanisms for use with driver side airbag modules comprising horn activation circuits comprise numerous parts that require additional installation steps and costs.

Therefore, it is desirable to provide an apparatus and method for providing a securement feature for an airbag module that uses a minimal amount of components and is easy to install and manufacture thereby reducing the associated costs.

SUMMARY

Exemplary embodiments are directed to an integrally formed snap-on fastener that is formed directly from the airbag module base or backing plate. In one exemplary embodiment, the snap-on fastener is formed from the center of the stamping on the backing or base plate, which is typically removed and discarded to provide an inflator opening. In another alternative exemplary embodiment, the fastener is configured to have a rounded exterior such that it interfaces with a round hole. In another alternative exemplary embodiment, the fastener is integrally formed using a deep draw manufacturing process. In other alternative exemplary embodiments, the fastener will contain features such as ribs to impart stiffness in the legs of the fastener.

In an alternative exemplary embodiment, the fasteners are formed separately and joined to the driver side airbag module base or backing plate via cold forming, welding or riveting. In this embodiment, these separate smaller stampings could be attached to the backing plate and then the backing plate is snapped to the airbag module and the steering wheel.

In yet another alternative exemplary embodiment, these stampings are complemented by a plastic piece to form a half circle or other suitable form.

In another alternative exemplary embodiment, a backing plate for securing an airbag module to a vehicle is provided. The backing plate comprising: a plurality of elongated mounting members each being drawn from the material of the backing plate wherein the plurality of elongated mounting members are integrally formed with the backing plate and each of the plurality of elongated mounting members has a portion comprising a periphery formed from the material of the backing plate and an opening extending into the elongated mounting member, the opening defining the periphery of the plurality of elongated mounting members.

In another alternative exemplary embodiment a method for manufacturing a backing plate of an airbag module is provided. The method comprising: stamping a blank material to form a periphery and a central opening of the backing plate, wherein a mounting surface is located between the central opening and the periphery; and deep drawing at least one mounting member from the mounting surface, wherein the at least one mounting member provides a securement feature for the backing plate.

In another alternative exemplary embodiment a backing plate for mounting an airbag module to a vehicle is provided. The backing plate comprising: a plurality of elongated mounting members and an opening configured to receive a portion of the inflator, the mounting members being formed integrally with the backing plate, wherein the mounting members are configured to provide a means for attachment of the backing plate to the vehicle; and wherein the plurality of elongated members are formed from material removed from said backing plate to define said opening.

In another alternative exemplary embodiment a backing plate for mounting an airbag module to a vehicle is provided. The backing plate comprising: a plurality of elongated mounting members and an opening configured to receive a portion of the inflator, the mounting members being formed from material removed from the backing plate to define said opening, wherein the mounting members are configured to provide a means for attachment of the backing plate to the vehicle.

In another alternative exemplary embodiment an airbag module is provided, the airbag module comprising: a backing plate; an inflatable cushion, the inflatable cushion being secured to the backing plate; an inflator for inflating the inflatable cushion, the inflator being secured to the backing plate; a plurality of elongated mounting members each being drawn from the material of the backing plate wherein the plurality of elongated mounting members are integrally formed with the backing plate.

BRIEF DESCRIPTION OF THE DRAWINGS

FIGS. 7-9 illustrate other alternative exemplary embodiments of the present invention;

FIGS. 19 and 20 illustrate locking mechanisms or locking pins formed by a deep drawn manufacturing process according to exemplary embodiments of the present invention;

FIGS. 21A-21E illustrate the deep draw process for forming locking mechanisms according to exemplary embodiments of the present invention.

DETAILED DESCRIPTION OF EXEMPLARY EMBODIMENTS

This application is also related to U.S. Pat. Nos. 5,380,037; 6,092,832; 6,196,573; 6,237,944; U.S. patent application Ser. No. 10/373,161, filed Feb. 24, 2003; Ser. No. 10/797,440 filed Mar. 10, 2004; and Ser. No. 11/085,817 filed Mar. 21, 2005, the contents each of which are incorporated herein by reference thereto.

Exemplary embodiments of the present invention are directed to an apparatus and method for securing an airbag module to a steering wheel.

In particular, exemplary embodiments of the present invention are directed to an airbag module connection assembly for use with "snap-in" driver side airbag modules and/or floating horns switches. Moreover, exemplary embodiments are directed to apparatus and methods for limiting the number of components and materials necessary to provide both a horn activation switch and/or a method or means for securing an airbag module to a steering wheel armature, which in turn will reduce the overall cost of the component. An exemplary embodiment comprises a backing plate or base plate stamped from a piece of stock material such as steel (e.g., cold rolled steel or equivalents thereof) wherein the backing plate defines a mounting area for a portion of the airbag module and a plurality of mounting members are configured to depend away from the mounting area, wherein the mounting members are configured for securement to the steering wheel.

Figure 1:
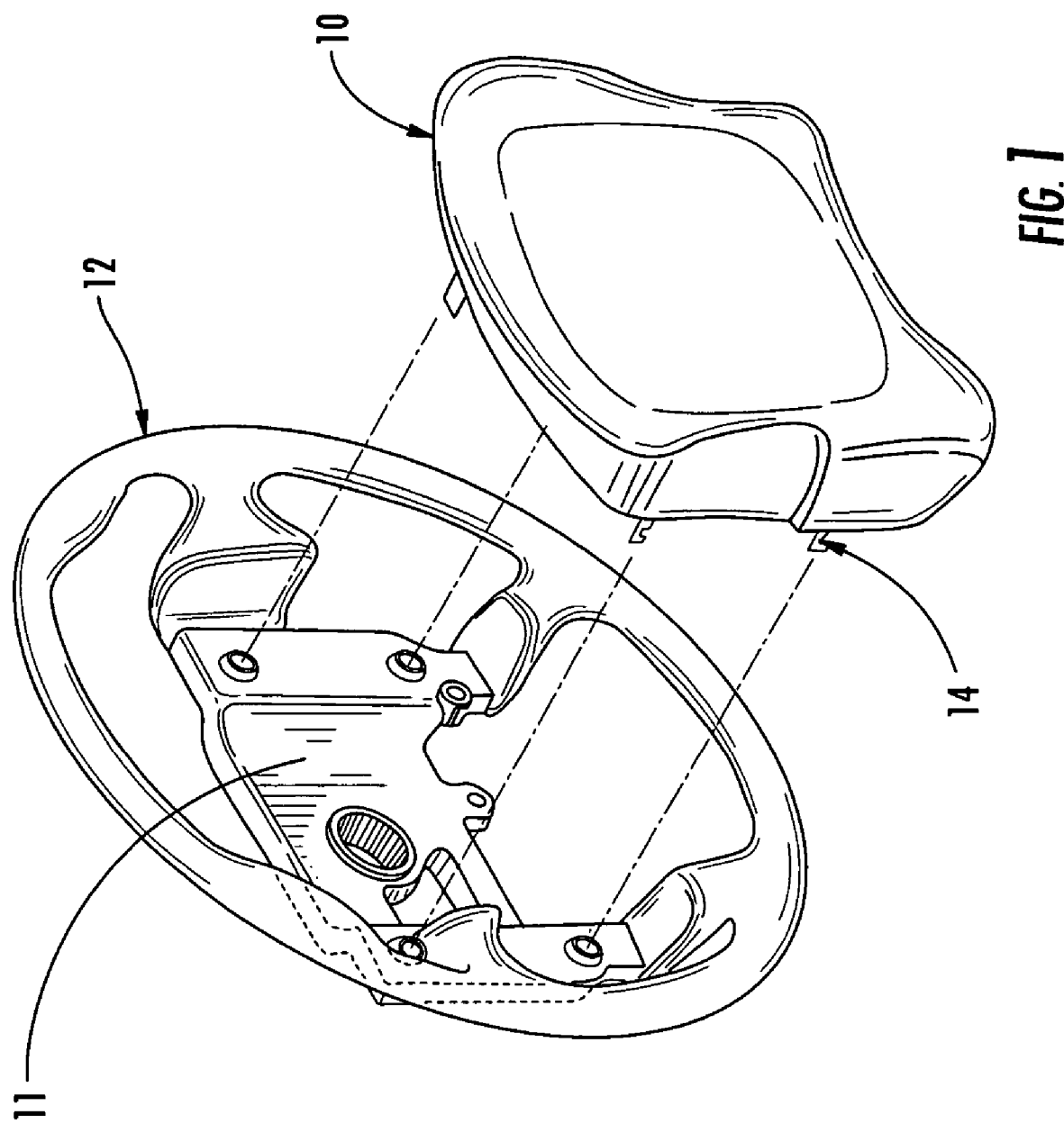
FIG. 1 is a perspective view of an airbag module and a steering wheel configured to receive the airbag module.
Figure 2:
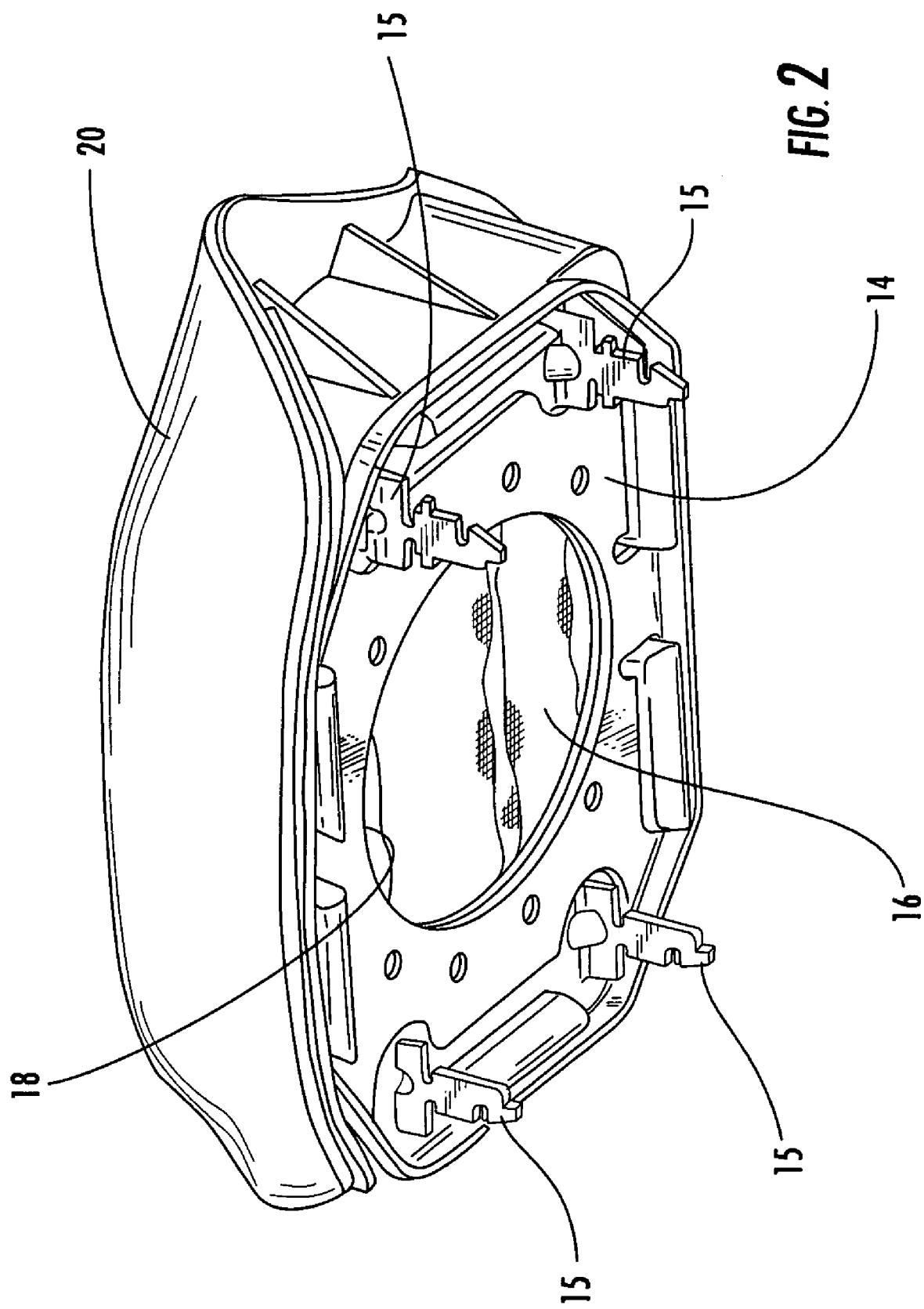
FIG. 2 is a perspective view of an airbag module.

Referring now to FIGS. 1 and 2, a driver side airbag module 10 is illustrated. Driver side airbag module 10 is typically mounted to a hub or armature 11 of a steering wheel 12. Typically, some form of mounting mechanism is provided to mount the airbag module to the steering wheel. As will be disclosed herein exemplary embodiments of the present invention are directed to mounting mechanisms for mounting the airbag module to the steering wheel wherein the cost and complexity of the same is reduced. Generally, airbag modules include a base plate or backing plate 14 configured for receiving and engaging an inflatable cushion 16 and an inflator (not shown) each of which is secured to the backing plate, which is then secured to the steering wheel. Although a driver side airbag module is illustrated, alternative exemplary embodiments of the present invention are contemplated, other non-limiting uses include mounting mechanisms for side airbag modules, roof rail airbags and passenger airbags.

Generally, and referring now to driver side airbag modules, the backing plate will include a central opening 18 configured for receiving a portion of the inflator therein. As is known in the related arts, the inflatable cushion is constructed out of a material configured for inflation upon receipt of an inflation gas from the inflator when certain predetermined vehicle conditions are sensed. The inflatable cushion is normally folded and covered by a plastic cover 20, which preferably has an outer soft pad. As is known in the related arts the cover may be secured to the backing plate in any suitable manner, such as by cover tabs snapped over indented portions in the backing plate, as best shown in FIG. 2. In addition, the cover preferably includes tear lines or weakened portions that permit the cover to open during inflation of the inflatable cushion.

FIG. 2 illustrates a mounting mechanism 15 described in commonly owned and assigned U.S. Pat. No. 6,196,573, the contents of which are incorporated herein by reference thereto. Accordingly, once the airbag module is assembled the same is secured to the steering wheel, wherein the locking mechanism (engages a complimentary feature (e.g., locking pin or locking spring) disposed on the steering wheel.

Figure 3:
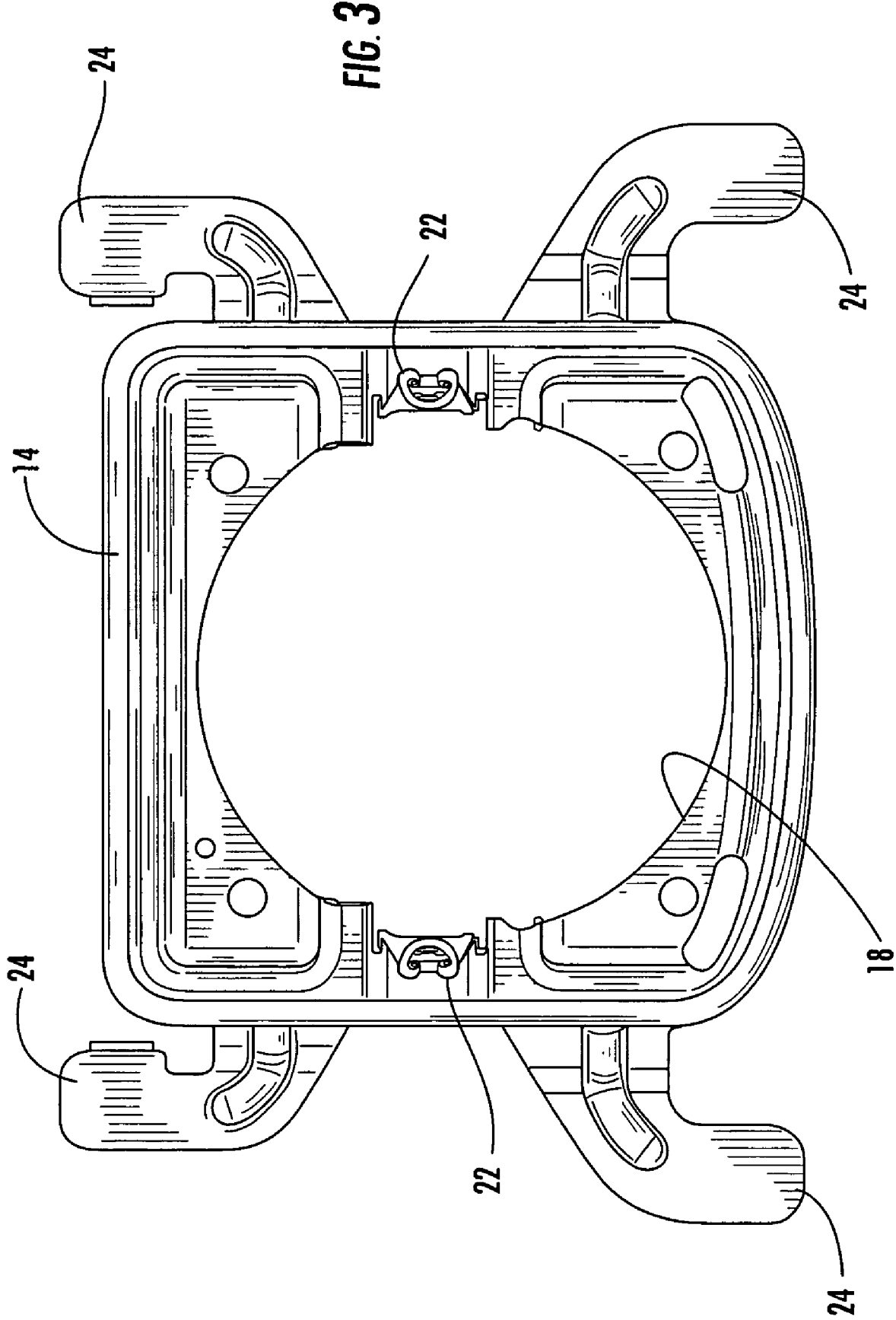
FIG. 3 is a bottom plan view of a base plate constructed in accordance with an exemplary embodiment of the present invention.
Figure 4:
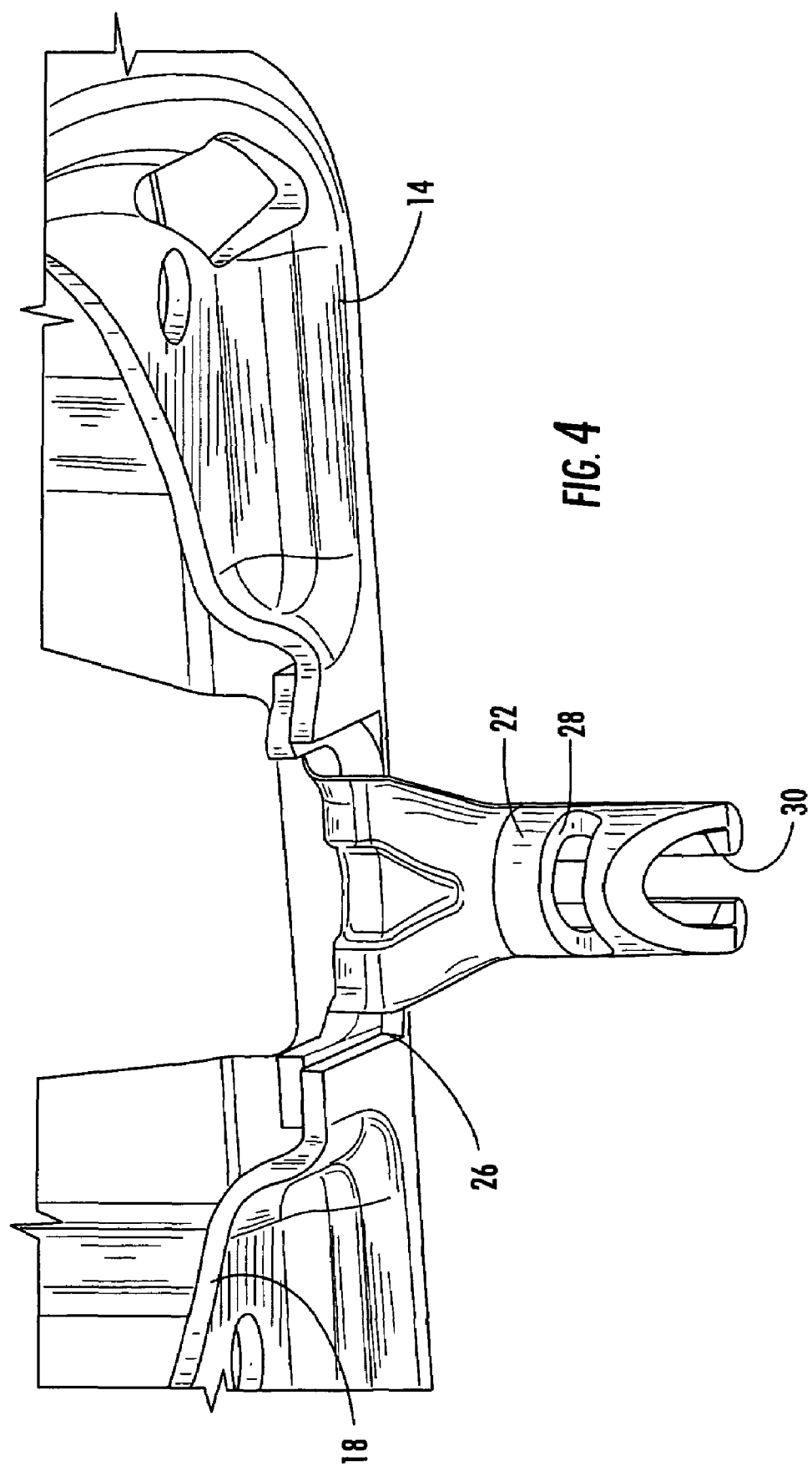
FIG. 4 is a partial perspective view of a base plate constructed in accordance with an exemplary embodiment of the present invention.
Figure 5:
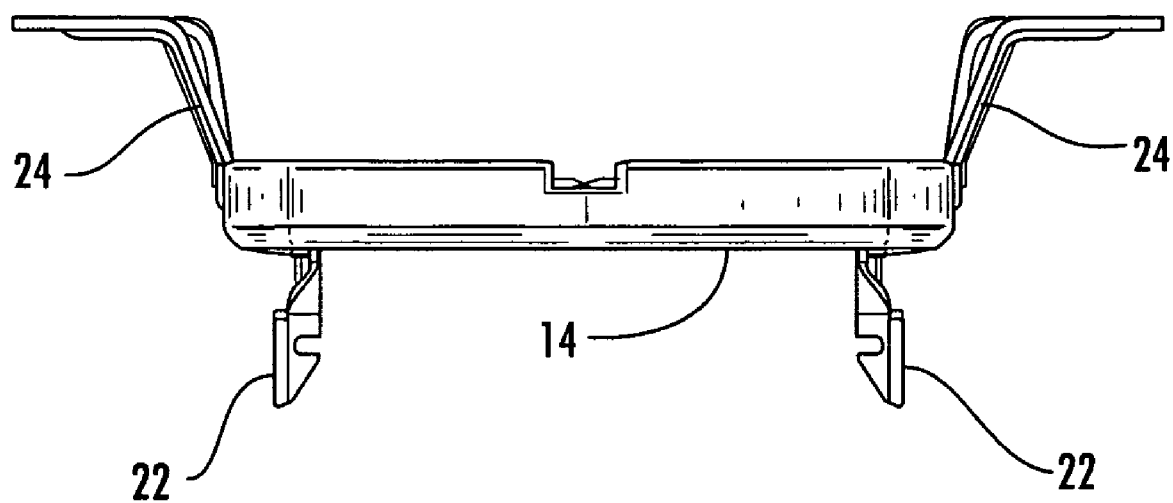
FIG. 5 is a side elevational view of a base plate constructed in accordance with an exemplary embodiment of the present invention.
Figure 6B:
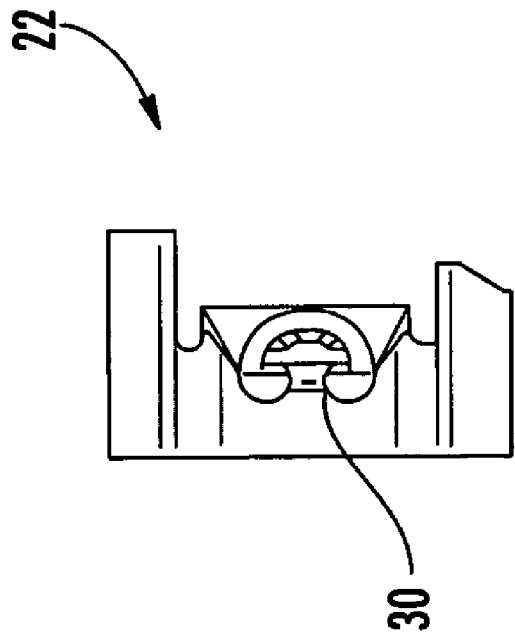
FIGS. 6A-6C illustrate an alternative exemplary embodiment of the present invention.
Figure 6A:
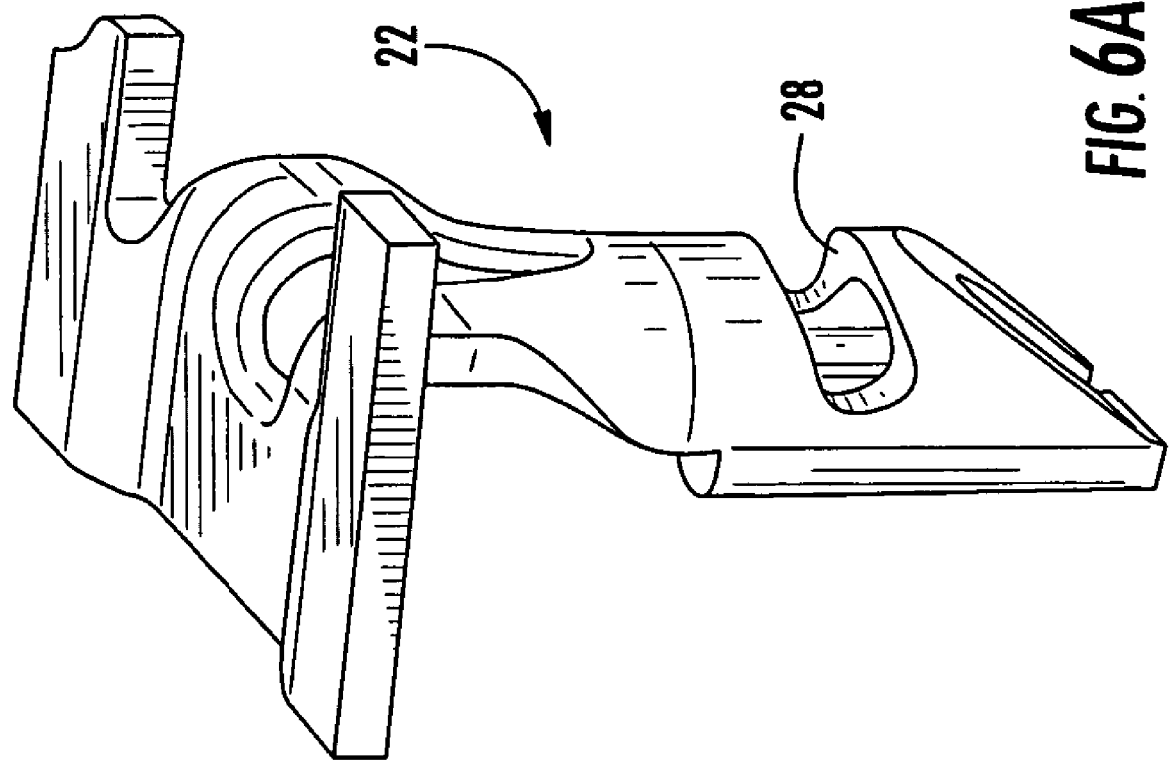
Figure 6C:
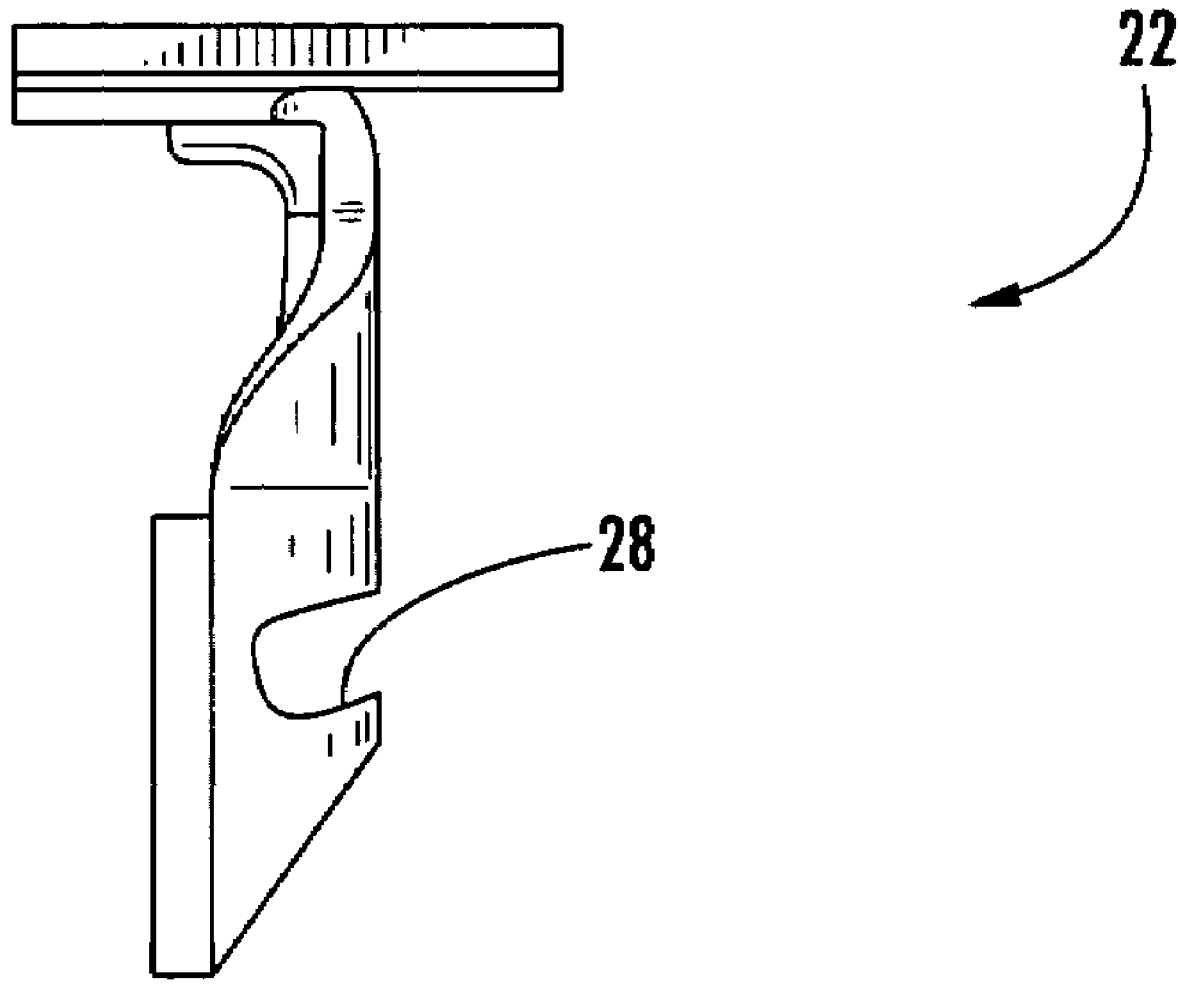
Figure 7:
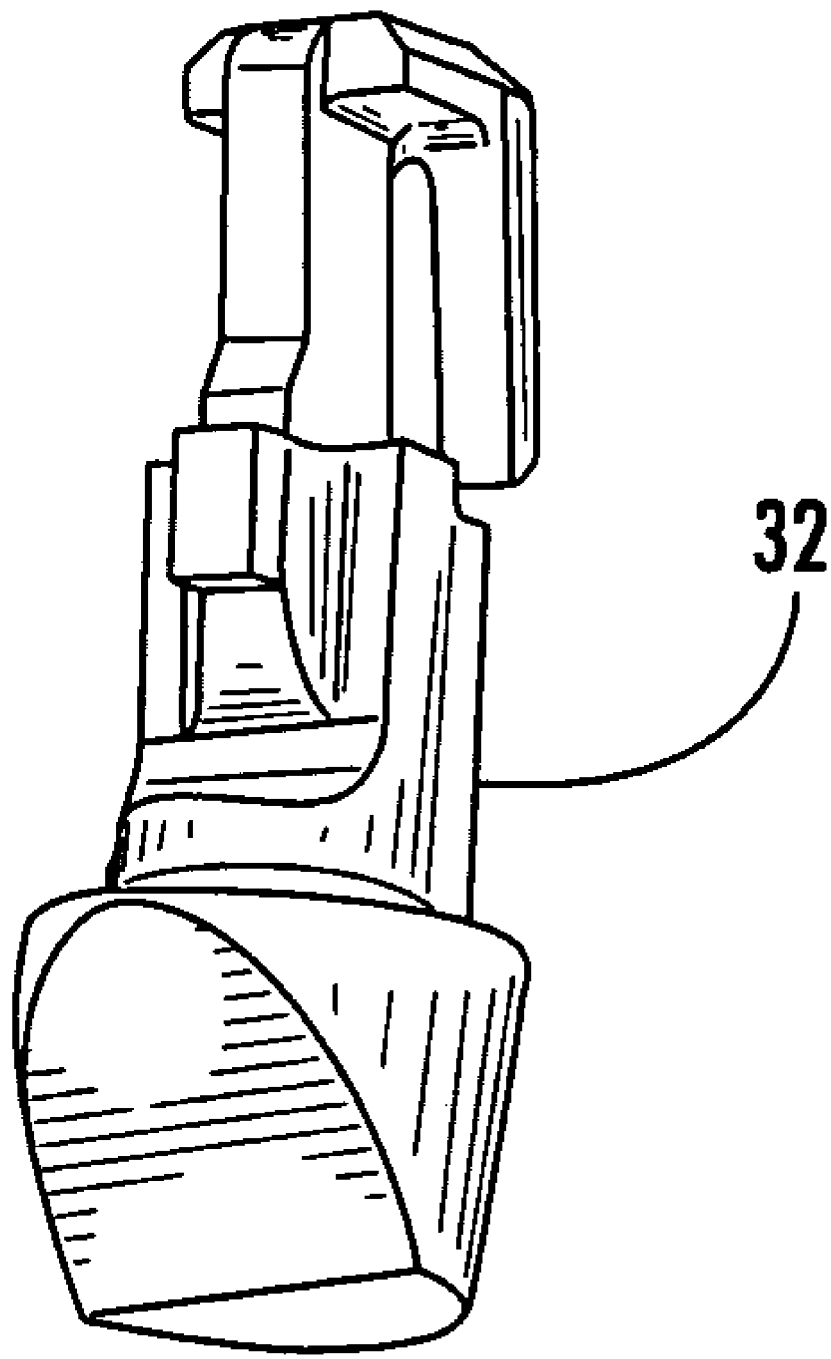

Referring now to FIGS. 3-6C, exemplary embodiments of the present invention are illustrated. FIGS. 3 and 4 illustrate backing plate 14 wherein the backing plate is configured to define a receiving area for receiving a portion of component parts of the airbag module (e.g., inflator, inflatable cushion, retainer ring, etc.) and a plurality of mounting flanges 24, which depend away from a periphery of the receiving area.

Referring now to FIGS. 3-10, exemplary embodiments of the present invention are illustrated. FIG. 3 illustrates a base plate or backing plate 14 wherein locking mechanisms or locking pins 22 are stamped from the stock material used for backing plate 14. In accordance with an exemplary embodiment locking mechanisms 22 are stamped at the same time base plate 14 is formed by a stamping process or alternatively the locking mechanisms are stamped separately from the excess material stamped out to form opening 18. Accordingly and if the locking mechanisms are formed at the same time, the die or tool used during the manufacturing process of base plate 14 is configured to both define base plate 14 as well as locking mechanism 22.

Moreover and since the locking mechanisms are formed from the same material, which is typically removed to provide inflator opening 18 the locking mechanisms are formed from material stock, which typically is discarded as waste. As shown in FIG. 3, base plate 14 comprises a plurality of integral arms 24, which define the portions of a periphery of the airbag module. Of course, backing plate 14 may be constructed without arms 24.

In an alternative exemplary embodiment, locking mechanisms 22 are stamped from the material removed to define inflator opening 18 wherein individual locking mechanisms 22 (FIGS. 6A-6C) are stamped from the material removed from the blank material to define opening 18. In this embodiment, inflator opening 18 is configured to have mounting openings 26 disposed about the periphery of inflator opening 18. Mounting openings 26 are configured to receive a portion of locking mechanism 22 wherein locking mechanism 22 is secured to base plate 14 by a separate manufacturing step (e.g., welding or other equivalent securement methods (e.g., cold forming)). Of course, the locking mechanisms may be secured to other portions of the base plate.

As illustrated, locking mechanisms 22 each comprising an engagement opening 28 configured to receive a locking pin or locking spring of a steering wheel armature wherein the locking spring is configured to allow a portion of the locking mechanism to pass by the locking spring until a portion of the locking spring is received within opening 28, thereby providing a means for "snap fit" or "snap in" securement of the airbag module to the steering wheel armature. In one exemplary embodiment the locking mechanism has rolled over edges or ribs for added strength. See for example, FIGS. 4, 5 and 6B. In this embodiment the locking mechanisms are formed by a separate manufacturing step wherein the same are formed from the material removed to define opening 18. Non-limiting examples of such processes include stamping, cutting, laser cutting, wherein single or multiple steps and tools or dies are used to define the locking mechanisms.

In addition and in another alternative exemplary embodiment, each locking mechanism, whether integrally formed with base plate 14 or subsequently attached thereto, comprises an elongated opening 30 configured to receive a portion of a bushing member 32 (FIG. 7), wherein a feature of the bushing is configured to have an interference or "snap fit" engagement with locking mechanism 22 and in particular the rounded portion of the locking mechanism. In accordance with an exemplary embodiment bushing 32 is configured to redefine a portion of the exterior configuration of mounting mechanism 22 in order to provide a more efficient means for passing locking mechanism 22 into an opening of the steering wheel armature, which will include a locking spring or locking pin for engaging opening 28.

In accordance with an exemplary embodiment the backing plate of the airbag module will be made up of a single stamped formed part with the locking mechanisms being made out of the excess material removed from the middle portion to define opening 18. This process provides a more efficient means for providing an airbag module and securement assembly, as the forming of the locking mechanism occurs at the same time as the base plate as well as from waste material of the base plate forming process.

In yet another alternative exemplary embodiment locking mechanism 22 is formed with a full rounded pin design (FIG. 8), which can be used with or without bushing 32.

Figure 10:
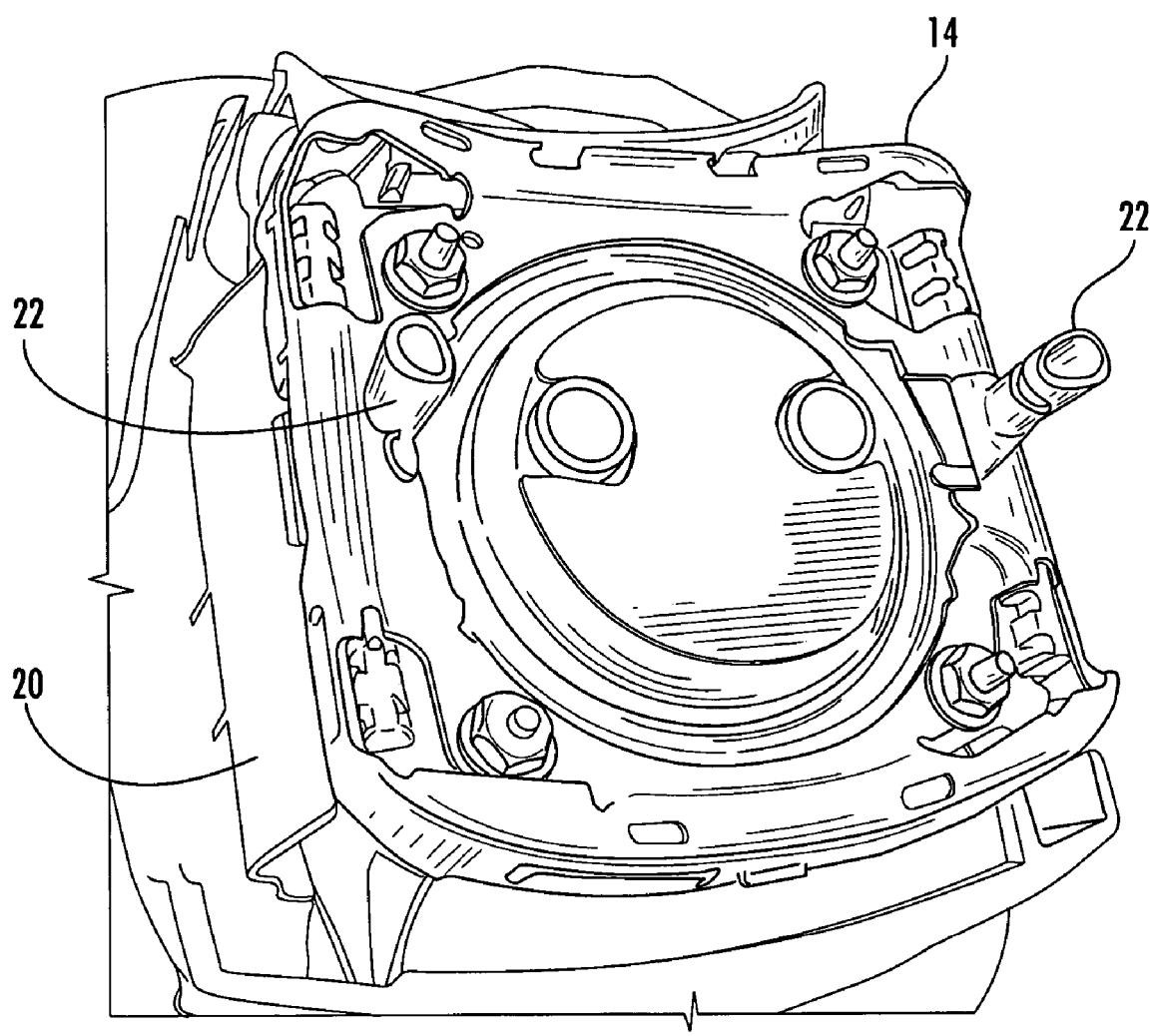
FIG. 10 shows an airbag module with a base plate of an exemplary embodiment of the present invention.
Figure 11:
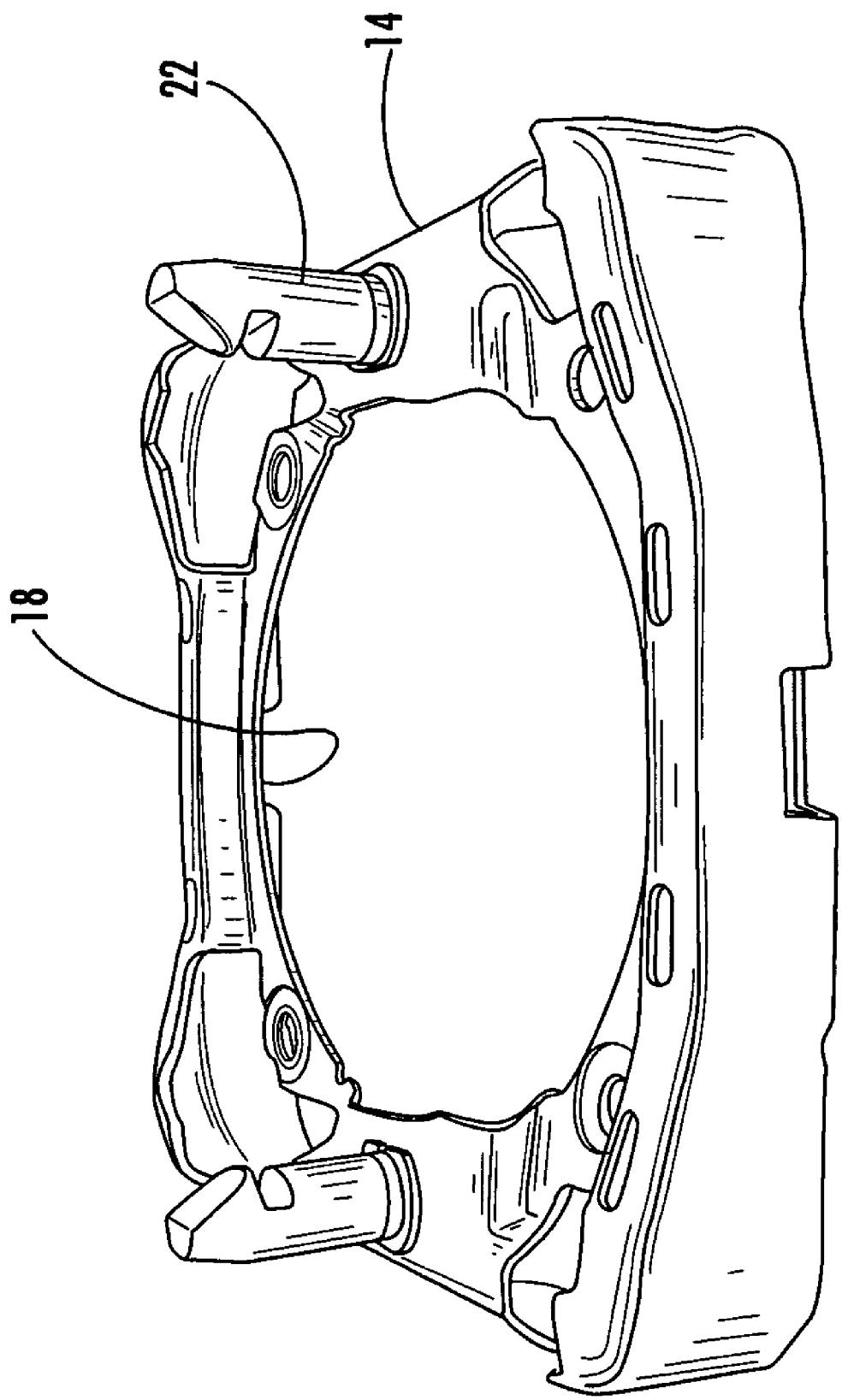
FIG. 11 illustrates a base plate with locking mechanisms cold formed thereto.
Figure 12:
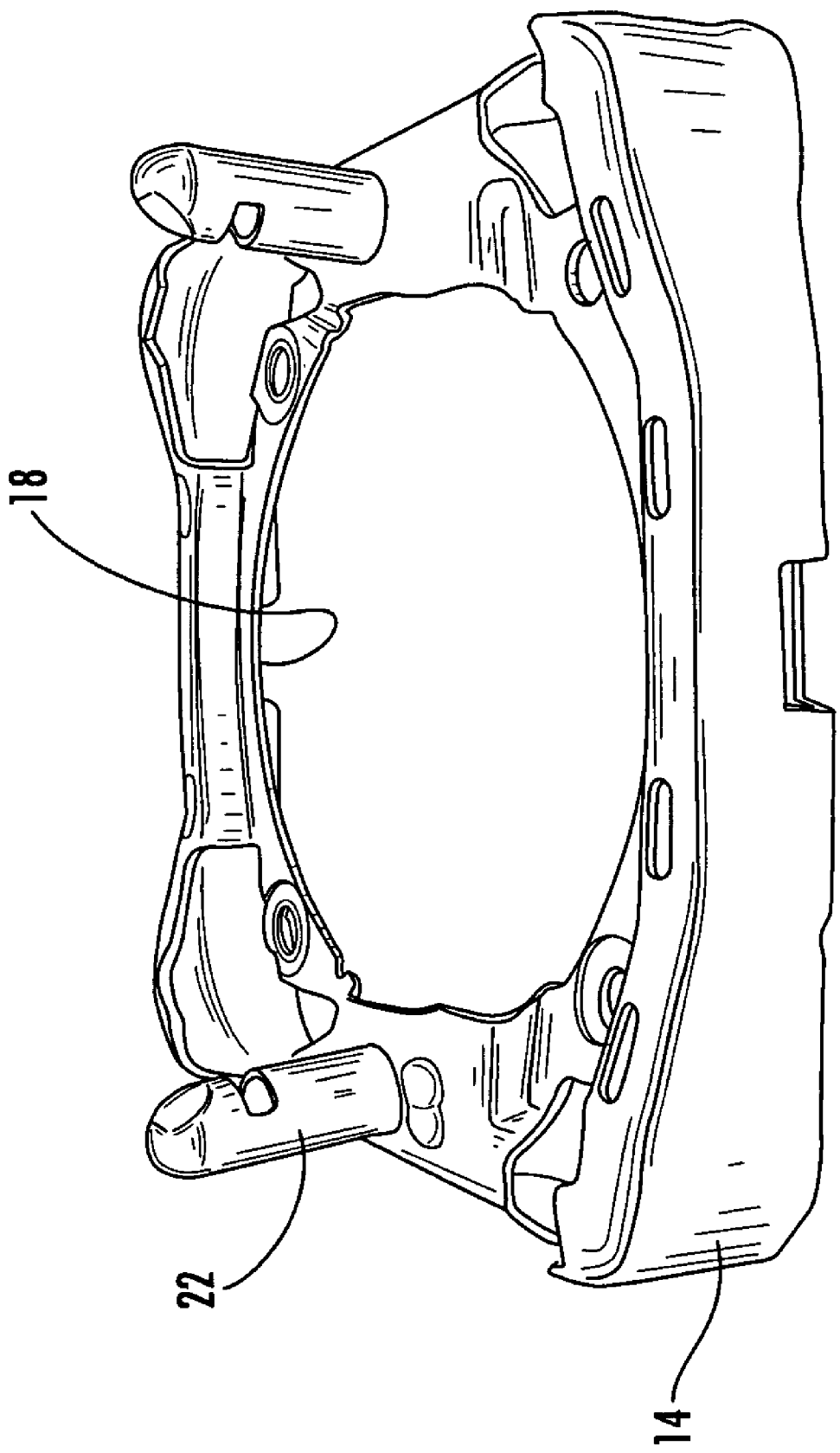
FIG. 12 illustrates a base plate with locking mechanisms integrally formed therewith using a deep draw manufacturing process.
Figure 16:
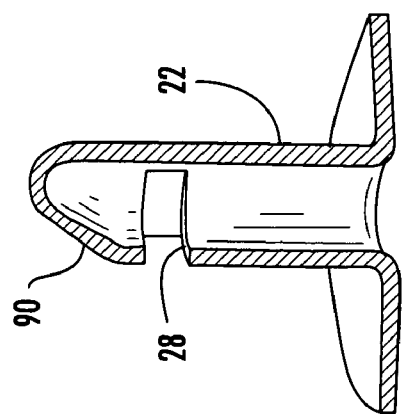
FIGS. 13-16 illustrate locking mechanisms or locking pins formed by a deep drawn manufacturing process according to exemplary embodiments of the present invention.
Figure 15:
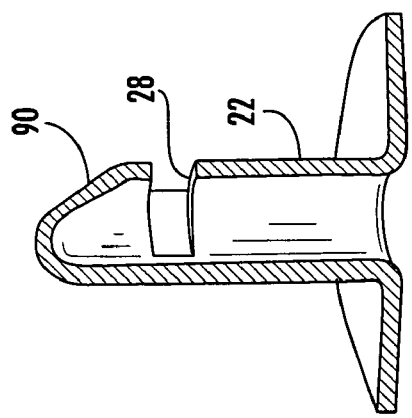
Figure 14:
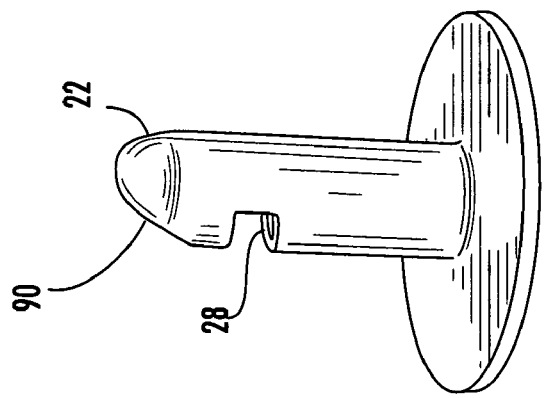
Figure 13:
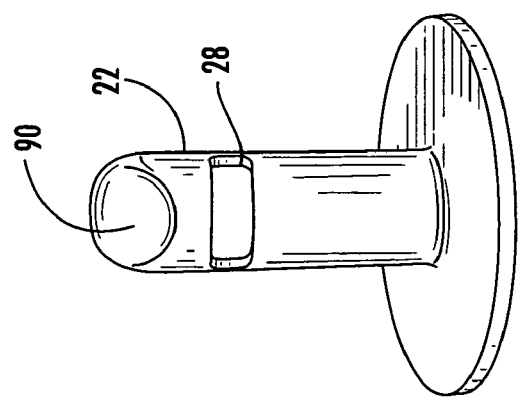
Figure 18:
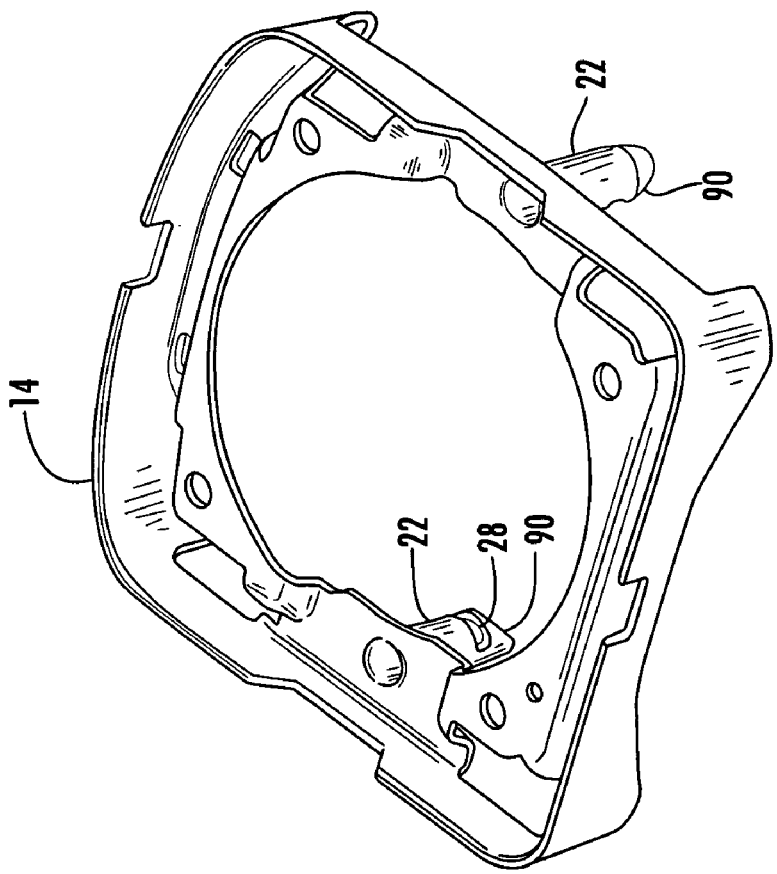
FIGS. 17-18 illustrate a backing plate or base plate with locking mechanisms or locking pins formed by a deep drawn manufacturing process according to exemplary embodiments of the present invention.
Figure 17:
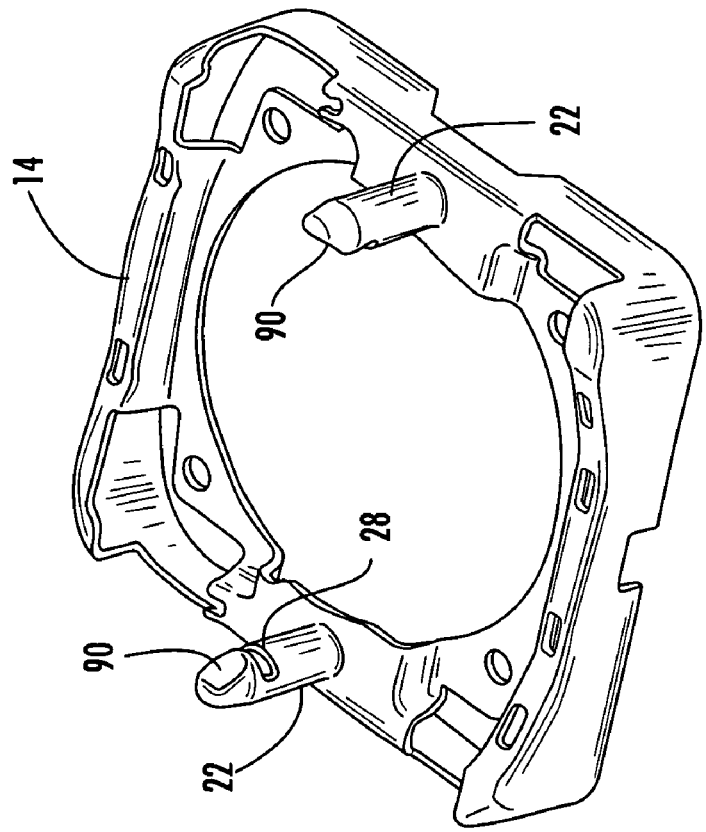

FIGS. 8 and 9 illustrate other alternative embodiments wherein integrally formed pins (FIG. 8) are shown with bushings and separately formed pins are secured with bushings (FIG. 11) to the backing plate. FIG. 10 illustrates an assembled driver side airbag module including an inflator with locking pins constructed in accordance with exemplary embodiments of the present invention.

In one embodiment, the mounting mechanism includes integrally formed mounting members or locking pins for attaching the module to the vehicle. In one embodiment, the mounting mechanism, including the base plate, is integrally formed in a single stamping operation on a single blank, which is preferably a single piece of metal, such as steel, having a constant cross-section which can easily be shaped in a single stamping process to form the base plate and the integral locking pins. Accordingly, and in this embodiment, the need to make separate mounting members is eliminated.

After assembly of the module, the module is easily snap-fittedly attached to the vehicle at a support plate as follows. The mounting members are moved in a first direction towards a face of the support plate and through apertures disposed therein such that the spring elements or locking springs move laterally outward until the slots on the distal ends of the mounting members are aligned with the spring elements. Then, the spring elements move laterally inward and into contact with the slots such that the spring elements are seated within the slots of the mounting members.

If it is desired to separate the module from the support plate, a screwdriver may be inserted through access apertures provided in a rear portion of the steering wheel (not shown), wherein the blade of the screwdriver is received within spaces provided and then manipulated until the blade contacts the spring elements. The spring elements can then be biased laterally outward and out of engagement with the slot. Non-limiting examples of the spring elements are illustrated as items 42 in U.S. Pat. No. 5,380,037, the contents of which are incorporated herein by reference thereto. Although the airbag module is shown as part of a steering wheel, it will be appreciated that the airbag module could be at any vehicle location.

Referring now to FIGS. 12-22 an alternative exemplary embodiment of the present invention is illustrated. Here backing plate 14 is formed with integral locking mechanisms that are formed from the material of the backing plate using a deep draw manufacturing process. Deep drawing manufacturing is sometimes referred to as the process of moving or displacing metal stock around a series of plugs or tools each having different dimensions. In essence the metal stock, commonly referred to as a blank, is shaped around the plug or tool during the forming process, wherein a first tool is applied with a first configuration and then another tool of a different configuration is applied and then another tool until the final configuration is reached. Thus, the characteristics of the material are not changed as the same is merely manipulated into its final configuration.

During this manufacturing process a portion of the blank is restrained from moving in one direction by a clamping device and the plug or tool is deep drawn into a die cavity to move the blank into the die to ultimately achieve the end shape that is desired. Accordingly, there are many shapes and configurations that can be made through deep drawing and stamping.

In accordance with an exemplary embodiment and for purposes of illustrating the deep draw manufacturing process used to form the locking mechanisms of exemplary embodiments of the backing plate, FIG. 19-22 illustrate portions of the steps of the deep draw process.

As illustrated in FIGS. 19 and 20, a metal stock 70 is first formed into a first configuration 72 by a first tool 74 depressed into metal stock 70, which is partially restrained. Thereafter, the first configuration is then formed into a second configuration 76 by a second tool 78 depressed into the metal of the first configuration. As shown in FIG. 19, the second tool is longer and has a smaller diameter than the first tool. Thereafter, the second configuration is then formed into a third configuration 80 by a third tool 82 depressed into the metal of the second configuration. Again, the third tool is longer and has a smaller diameter than the second tool, wherein the third configuration begins to resemble the locking mechanism of the backing plate.

After the final configuration is reached the locking mechanism is shaped to have a chamfered end portion 90, which may be formed by the deep draw process or alternatively by a separate pressing process. Once the deep draw process is complete the blank will have the configuration illustrated in FIG. 22. At this point the blank is then brought to a station where a stamping process is used to form the backing plate configurations illustrated in FIGS. 17 and 18 (e.g., the periphery of the wall of the backing plate, opening 18 and all the other required openings, valleys and angles illustrated in the Figures). Thereafter, and as a final step a tool is used to cut or pierce the locking mechanism is have slot 28 disposed therein. Thus, a deep draw manufacturing process is used to form the backing plate illustrated in FIGS. 17 and 18 wherein a blank is formed into an item having locking mechanisms disposed therein by a deep draw manufacturing process and thereafter the blank with the locking mechanisms is stamped into the configuration of the backing plate and then the locking mechanisms are cut to have slots 28 disposed therein. This process negates the step of attaching separate components (e.g., locking mechanism) to the backing plate.

In accordance with an exemplary embodiment, the locking mechanisms are formed by inserting a series of progressively smaller diameter tools into the blank material in order to ultimately form the integral locking mechanisms of the blank material.

FIGS. 21A-21E illustrate a schematic representation of a deep drawing process contemplated in accordance with an exemplary embodiment of the present invention. As illustrated, a sheet 70 of material used for backing plate 14, commonly referred to as a blank, is shown placed over a die 90 and positioned for the deep drawing operation which is performed by a punch or tool (74, 78, and 82) that exerts a downward force on the sheet. The action of the tool on the sheet creates locking mechanism 22 (e.g., FIGS. 13-16).

The tool or punch is shown as substantially cylindrically-shaped although any number of different size and shaped punches could be utilized. The tool can be actuated pneumatically or hydraulically, or by any other means illustrated schematically as item 91, to cause the tool to plastically deform the sheet into the desired configuration. Accordingly and during each step of the deep draw process, the thickness of the material comprising blank 70 and ultimately the walls of locking mechanism 22 remains substantially the same thus; the composition of the material remains the same. In essence, the deep draw process reconfigures the shape of the material without stretching the same.

Each complimentary die has a cavity, which also helps to form the composite shape of the deep drawn element (e.g., locking mechanism 22). FIGS. 21A and 21B illustrate the first forming step wherein FIGS. 21C and 21D illustrate the second forming step wherein the blank material after being formed in the first forming step with configuration 72 is advanced to another station wherein a second tool 78 moves the material of configuration 72 into a die having a cavity, which when combined with tool 78 helps to form configuration 76. Thereafter, configuration 76 is placed above another cavity until the final configuration is reached.

Figure 22:
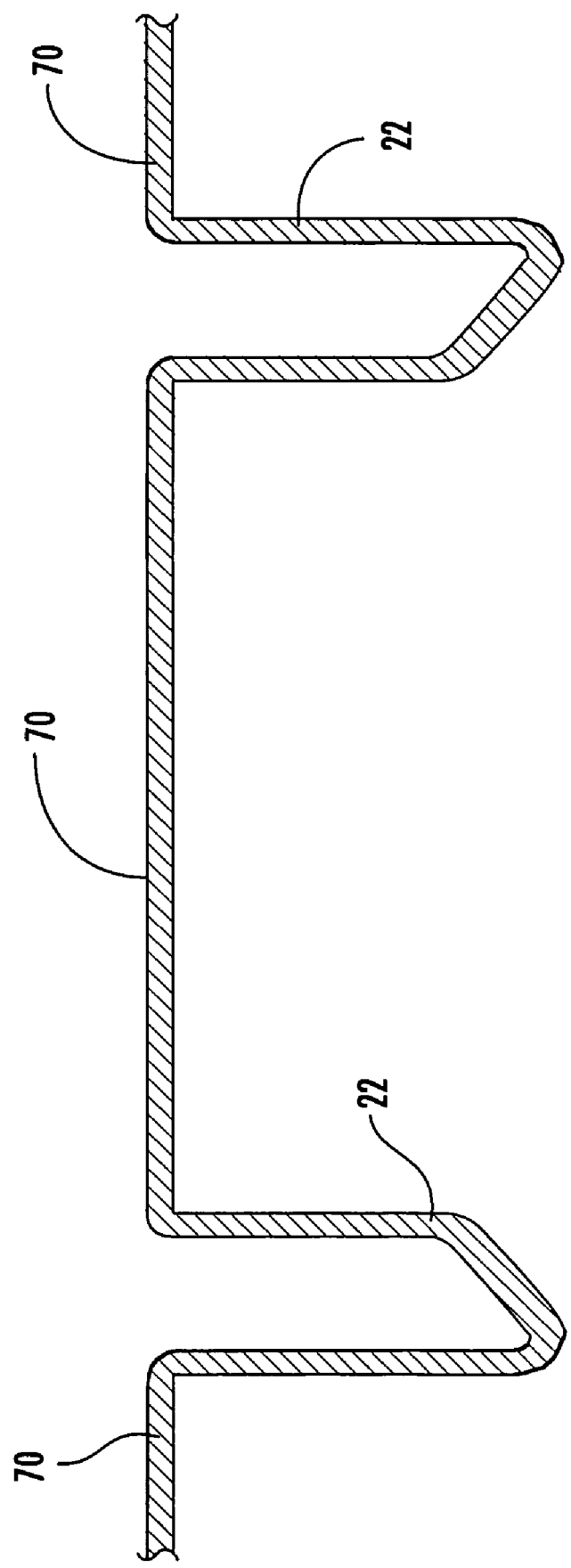
FIG. 22 illustrates a blank having locking mechanisms formed therein according to the deep draw process of exemplary embodiments of the present invention.

It should be appreciated that FIG. 22 merely depict schematically representative embodiments of a tool and die apparatus and that any one of a number of deep drawing machinery could be utilized in accordance with the present invention to create the locking mechanism. In addition, and in accordance with an exemplary embodiment the number and size of the tools used may vary.

During operation the sheet remains in place over the die by a hold down plate 71, which has an opening 73 through which the tool passes. This hold down plate, as its name applies, is utilized to help maintain the sheet in place as the tool extends downwardly to deep draw the sheet into the cavity. One skilled in the art will recognize that other means for holding the material in place could be utilized as well. FIG. 21B illustrates the tool being filly inserted into the cavity wherein a portion of the blank is manipulated into the cavity to define the first shape or configuration 72.

Referring now to FIG. 21E, a similar schematic representation of a tool, which forms the final configuration of the deep drawn structural element, is illustrated. As shown, the deep drawn locking mechanism has a chamfered end 90 that is created in the final step of the deep draw process, which may be formed by the configuration of tool 82 and the corresponding die into which the tool is received. Alternatively, the chamfered end may be formed by a separate step after the deep drawing process wherein a portion of the distal end of the locking mechanism is pressed inwardly to form the chamfered end of the locking mechanism.

Again, these figures represent one of many different configurations that can be formed in accordance with exemplary embodiment of the present invention to create the deep drawn element, which can be later processed into the backing plate 14. For example, it also should be appreciated that a punch and die or similar apparatus could be utilized to cut or further shape the structural element into a secondary shape which could be formed into the finished device. Alternatively, further deep drawing processing may be implemented until the structural element is worked into the desired structure. Processing operations could utilize also use cutting dies and punches to form other desired configurations. In accordance with an alternative exemplary embodiment the locking mechanisms may be separately formed by the deep drawing process and then attached to a stamped backing plate by welding or cold forming or other equivalent attachment methods. In this embodiment, the locking mechanisms may be drawn from the material stamped out of the stock material to form opening 18.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A backing plate for mounting an airbag module to a vehicle, the backing plate comprising:
   a plurality of elongated mounting members each being formed by a deep drawing process, wherein the plurality of elongated mounting members are formed from the material of the backing plate and the plurality of elongated mounting members are integrally formed with the backing plate and each of the plurality of elongated mounting members has a portion comprising a periphery formed from the material of the backing plate and an opening extending into the elongated mounting member, the opening defining the periphery of the plurality of elongated mounting members, wherein the periphery is received within an opening of a steering wheel armature.

2. The backing plate as in claim 1, wherein the periphery is a cylindrical and the cylindrical periphery of each of the plurality of elongated mounting members further comprises an engagement opening configured to secure the backing plate to the steering wheel armature.

3. The backing plate as in claim 2, wherein each of the plurality of elongated mounting members comprises a distal end with an angled surface.

4. The backing plate as in claim 2, wherein the backing plate defines a portion of a receiving area for receiving an inflatable cushion therein.

5. The backing plate as in claim 1, wherein each of the plurality of elongated mounting members comprises a distal end with an angled surface.

6. A backing plate for mounting an airbag module to a vehicle, the airbag module having an inflator, the backing plate comprising:
- a plurality of elongated mounting members and an opening configured to receive a portion of the inflator, the plurality of elongated mounting members being formed by a deep drawing process, wherein the plurality of elongated mounting members are secured to the backing plate, and the plurality of elongated mounting members are configured to provide a means for attachment of the backing plate to the vehicle; and
- wherein the plurality of elongated mounting members are formed from material removed from said backing plate to define said opening.

7. The backing plate as in claim 6, wherein the plurality of elongated members are configured to receive and engage a locking pin secured to a steering wheel armature.

8. The backing plate as in claim 6, wherein the plurality of elongated members each comprise a cylindrical portion and a plastic bushing is inserted therein, wherein the plastic bushing is configured to secure the backing plate to a steering wheel armature.

9. A backing plate for mounting an airbag module to a vehicle, the airbag module having an inflator, the backing plate comprising:
- a plurality of elongated mounting members and an opening configured to receive a portion of the inflator, the plurality of elongated mounting members being formed from material removed from the backing plate to define said opening, wherein the plurality of elongated mounting members are formed by a deep drawing process and the plurality of elongated mounting members are configured to provide a means for attachment of the backing plate to the vehicle.

10. The backing plate as in claim 9, wherein the plurality of elongated mounting members are configured to receive and engage a locking pin secured to a steering wheel armature.

11. The backing plate as in claim 9, wherein the plurality of elongated mounting members each have a cylindrical portion and a plastic bushing is inserted therein, wherein the plastic bushing is configured to secure the backing plate to a steering wheel armature.

12. An airbag module, comprising:
- a backing plate; and
- an inflatable cushion, the inflatable cushion being secured to the backing plate;
- an inflator for inflating the inflatable cushion, the inflator being secured to the backing plate;
- a plurality of elongated mounting members each being formed by a deep drawing process, wherein the plurality of elongated mounting members are formed from the material of the backing plate and the plurality of elongated mounting members are integrally formed with the backing plate and each of the plurality of elongated mounting members has a portion comprising a periphery formed from the material of the backing plate and an opening extending into the elongated mounting member, the opening defining the periphery of the plurality of elongated mounting members, wherein the periphery is received within an opening of a steering wheel armature.

13. The airbag module as in claim 12, wherein the periphery of each of the plurality of elongated mounting members has a portion comprising a cylindrical periphery and wherein the cylindrical periphery of each of the plurality of elongated mounting members further comprises an engagement opening configured to secure the backing plate to said steering wheel armature and each of the plurality of elongated mounting members further comprises a distal end with an angled surface.

* * * * *